Feb. 28, 1939.   M. C. SPENCER   2,149,126
OSCILLATORY MOTOR
Filed April 13, 1938
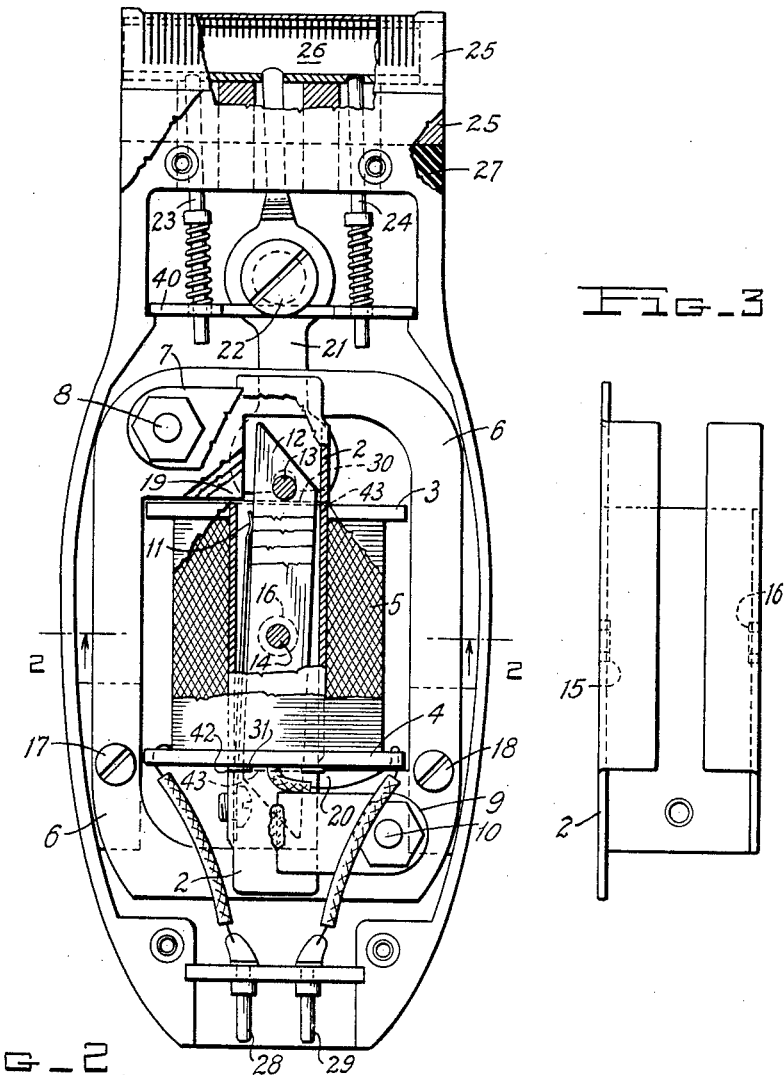
INVENTOR
Millard Cole Spencer
BY
Wm. J. Herdman
ATTORNEY.

Patented Feb. 28, 1939

2,149,126

UNITED STATES PATENT OFFICE 2,149,126

OSCILLATORY MOTOR

Millard Cole Spencer, East Orange, N. J.

Application April 13, 1938, Serial No. 201,654

4 Claims. (Cl. 172—126)

My invention relates to oscillatory electric motors and pertains in particular to that type of such motors as are portable and suitable for driving hair clippers, electric razors, massage machines and similar devices for performing useful work.

One of the principal objects contemplated by my invention comprises producing a simple, rugged and inexpensive driving means for portable devices such as electric razors and the like.

Another object of my invention comprises producing an electric driving means which does not require make and break contacts, thus eliminating the wear of such contacts and the need for frequent adjustment and replacements.

A further object of my invention comprises producing an electric drive for razors and the like which causes no radio interference.

A further object comprises producing an electric drive which is positive and high speed.

A still further object comprises providing a drive which is self starting.

I accomplish all of the above noted desirable results and others which will hereafter become apparent by means of the novel construction, combination and arrangement of parts which will be hereinafter more specifically described with reference to the accompanying drawing forming a part of this specification and in which like reference numerals designate corresponding parts.

In the drawing:

Fig. 1 is a partially broken and sectioned enlarged view of my improved motor as employed in connection with an electric razor; and Fig. 2 is a sectional view of the motor taken on the line 2—2 of Fig. 1; and Fig. 3 is a side elevation of the coil support of the motor with coil, armature and armature spring removed.

Referring now particularly to the figures in which I have illustrated, by way of example only, my improved motor as a driving means for an electric razor. The motor comprises a yoke or frame 6 which is made of a stacking of thin steel laminations, as shown. These laminations are substantially rectangular in shape with the outer corners rounded off. Square projections or shoulders 19 and 20 are provided in the laminations, are integral with the laminations and are located at two diametrically opposite corners of the yoke to form diametrically positioned pole pieces or pole faces. The coil support 2 of non-magnetic material, preferably brass, is formed in open channel shape as shown in Fig. 3 and is supported within the yoke 6 by means of lugs 7 and 9 soldered to extended portions of the coil support as shown. These lugs are in turn held by means of bolts 8 and 10 which serve to bind the laminations of the yoke together. Shims as 30 and 31, Fig. 2, preferably of thin brass, are provided with the ends 43 and 42 respectively bent over at right angles as shown in Fig. 2, against which the coil heads 3 and 4 rest and serve to prevent spreading of the heads when the coil 5 is wound therebetween. These shims are provided with holes opposite the ends of the shaft 14 as shown in Fig. 2 to obviate a short circuited turn within the coil 5. The coil 5 is wound of insulated wire and of sufficient ampere turns to give the proper magnetizing force when the coil is enlivened by 110 or 120 volts alternating current. A laminated armature 12 is located along the central axis of the yolk 6 and two diametrically opposite faces of this armature are located in close proximity to the pole faces 19 and 20, respectively. The outer ends of the armature are cut away as shown at an angle of 45 degrees to reduce the magnetic leakage from the ends of the armature to the magnetic yoke, thus forcing the magnetic flux to concentrate in the armature at the extremities and to pass across the air gap into the respective pole faces. The laminations of the armature may be held together by rivets or by drive fit of the shaft 14 and pin 13. The armature is pivoted centrally by the shaft 14 with respect to the coil support 2 and the yoke 6 in the coil support in bushings 15 and 16 of insulating material such as Bakelite to avoid presenting a short circuited turn within the coil 5. A leaf spring 11 is supported within the coil form 2 by means of a screw as shown and the free extremity of the spring bears against the armature 12 to normally cause the armature to rest with the extremities thereof away from the pole faces 19 and 20, respectively. Terminals for the coil 5 are provided and are soldered to contact prongs 28 and 29 adapted to receive the usual socket attached to a flexible conducting cord for conducting operating current to the coil.

The motor thus described may be placed within a mechanism containing and supporting handle of insulating material 27 shaped as shown to fit the hand, and the motor may be held in such handle by means of screws 17 and 18. The handle is of the usual form employed with electric razors and consists of two substantially symmetrical halves, the top half of which has been removed for clarity in the drawing.

A lever or link 21 is pivoted within the handle 27 by pivot 22 and one extremity thereof is provided with a U-shaped opening adapted to fit over the pin 13 in the armature 12. The other extremity of the lever or link 21 engages in a slot in the moveable member 26 of the razor cutting head, which is operatively maintained in contact against the fixed cutting head 25 by means of the spring propelled pins 23 and 24, supported by the cross bar 40, which engage and move with the moveable cutting head 26.

The action of my improved oscillatory motor is as follows:

When an electric current flows through the coil 5 the magnetic flux set up in the armature crosses the air gap into the pole faces and pulls the ends of the armature up to the pole faces. When the current is removed the flat spring 11 drives the armature back into its original position. When the coil is connected to a 60 cycle alternating current, the armature is pulled over to the pole faces every time the current approaches a maximum, whether such maximum is positive or negative. With the ordinary 60 cycle source of power, this causes 120 complete vibrations of the armature per second and consequently of the moveable cutter head 26. I have found, however, that by suitably adjusting the applied voltage in razors incorporating my invention, that the armature can be caused to vibrate at 60 times a second.

While I have illustrated my improved motor as employed in useful work such as accomplished by an electric razor, it is obvious that my motor may be employed to perform other similar types of useful work as, for example, it might be used to operate electric massage machines and other portable devices employing rapid vibratory motion.

It will be observed from the foregoing that my improved motor is simple, rugged and inexpensive; that it does not require make and break contacts, thus eliminating the wear of such contacts and the need for frequent adjustments and replacements, and it will not, because of the elimination of make and break contacts, cause radio interference. It will be observed, further, that my improved motor is positive and high speed and that it is self-starting.

Although I have shown and fully described, by way of example, only one embodiment of my invention, it will be apparent that many changes can be made therein without departing from the intended scope and spirit of the invention. I do not, therefore, desire to limit myself to the foregoing except as may be pointed out in the appended claims in which I claim and desire to secure by United States Letters Patent the following:

1. An oscillatory motor comprising, a core of magnetic material having enclosed shoulders integral therewith providing diametrically disposed pole faces, a coil support of non-magnetic material supported within said core, an armature pivoted within said support centrally with respect to both said armature and said core, the extremities of said armature being tapered and disposed adjacent said pole faces respectively, a coil on said support and surrounding said armature and resilient means between said armature and said support for normally holding said armature away from said pole faces.

2. An oscillatory motor comprising, a closed laminated core having enclosed shoulders providing diametrically disposed pole faces, a coil support of non-magnetic material supported within said core, a laminated armature mounted within said coil support and pivoted in said support centrally with respect to said armature and said core, the extremities of said armature being tapered and disposed adjacent said pole faces respectively, a coil surrounding said armature and supported by said coil support and resilient means attached to said coil support and engaging said armature.

3. An oscillatory motor comprising, a laminated core enclosing diametrically opposed shoulders integral therewith, a coil support of non-magnetic material supported by said core within said core, a laminated armature within said coil support and pivoted in said support centrally both with respect to said armature and said core, the extremities of said armature being pointed and disposed adjacent said shoulders respectively, a coil surrounding said armature and supported by said coil support, and a resilient member attached to said coil support and adapted to normally hold the extremities of said armature away from said shoulders.

4. An oscillatory motor comprising, a closed laminated core having enclosed shoulders providing diametrically disposed pole faces, a coil support of non-magnetic material supported by said core within said core, a laminated armature within said coil support and pivoted in said support centrally both with respect to said armature and said core, the extremities of said armature being tapered and disposed adjacent said pole faces respectively, a coil surrounding said armature and supported by said coil support, resilient means attached to said coil support and engaging said armature, a pin near one extremity of said armature, a link operatively associated with said pin and means operatively associated with said link for performing useful work.

MILLARD COLE SPENCER.